United States Patent [19]

Valyocsik

[11] Patent Number: 4,619,820

[45] Date of Patent: * Oct. 28, 1986

[54] SYNTHESIS OF ZSM-23 ZEOLITE AND THE PRODUCT PRODUCED

[75] Inventor: Ernest W. Valyocsik, Yardley, Pa.

[73] Assignee: Mobil Oil Corporation, New York, N.Y.

[ * ] Notice: The portion of the term of this patent subsequent to Dec. 25, 2001 has been disclaimed.

[21] Appl. No.: 808,367

[22] Filed: Dec. 13, 1985

Related U.S. Application Data

[63] Continuation of Ser. No. 661,759, Oct. 17, 1984, abandoned, which is a continuation-in-part of Ser. No. 490,083, Apr. 29, 1983, Pat. No. 4,490,342, and a continuation-in-part of Ser. No. 490,084, Apr. 29, 1983, Pat. No. 4,531,012.

[51] Int. Cl.$^4$ .............................................. C01B 33/28
[52] U.S. Cl. .................................... 423/328; 423/329; 423/330; 423/332; 423/333; 423/335; 423/339; 502/60; 502/62; 502/77; 502/232
[58] Field of Search .............................. 423/326–333, 423/335, 339; 502/60, 62, 77; 260/448 C

[56] References Cited

U.S. PATENT DOCUMENTS 4,076,842  2/1978  Plank et al. .......................... 423/328

FOREIGN PATENT DOCUMENTS 0051318 12/1982 European Pat. Off. .
2077709  5/1981 United Kingdom ................ 423/328

OTHER PUBLICATIONS

Joseph G. Cannon et al, "1,6–Diammonium-2,4–Hexadiyne Analogs of Hexomethonium" *Journal of Medical Chemistry* vol. 17, No. 3, pp. 355–358 (1974).

Parker et al "Synthesis and Some Properties of Two Novel Zeolites, KZ-1 and KZ-2", Zeolites vol. 3, 1983, pp. 8–11.

*Primary Examiner*—John Doll
*Assistant Examiner*—Jackson Leeds
*Attorney, Agent, or Firm*—A. J. McKillop; M. G. Gilman; L. P. Hobbes

[57] ABSTRACT

An improved method of synthesizing highly siliceous ZSM-23 zeolitic material is disclosed and claimed. The method comprises preparing a reaction mixture which comprises sources of an alkali metal, an oxide of aluminum ($Al_2O_3$), an oxide of silicon ($SiO_2$), water and a nitrogen-containing organic cation $R^+$, and having the following composition, in terms of mole ratios:

|  | Broad | Preferred |
|---|---|---|
| $SiO_2/Al_2O_3$ | 5,000 to ∞ | 10,000 to ∞ |
| $H_2O/SiO_2$ | 5 to 200 | 20 to 100 |
| $OH^-/SiO_2$ | 0 to 0.60 | 0.10 to 0.40 |
| $M^+/SiO_2$ | 0.01 to 2.0 | 0.10 to 1.0 |
| $R^+/SiO_2$ | 0.01 to 2.0 | 0.05 to 1.0 | wherein $M^+$ is a cation of an alkali or alkaline earth metal and $R^+$ is an organic cation of the formula $(CH_3)_3N^+$—$R_1$—$N^+(CH_3)_3$ wherein $R_1$ is a saturated or unsaturated straight chain hydrocarbon group having seven carbon atoms, and maintaining the mixture at crystallization conditions until crystals of the ZSM-23 zeolite are formed. Thereafter, the crystals are separated from the liquid and recovered.

18 Claims, No Drawings

SYNTHESIS OF ZSM-23 ZEOLITE AND THE PRODUCT PRODUCED

This is a continuation of copending application Ser. No. 661,759, filed on Oct. 17, 1984, now abandoned, which is a continuation-in-part of application, Ser. No. 490,083, filed Apr. 29, 1983, now U.S. Pat. No. 4,490,342, and a continuation-in-part of application Ser. No. 490,084 filed Apr. 29, 1983, now U.S. Pat. No. 4,531,012.

BACKGROUND OF THE INVENTION

1. Field of the Invention

This invention relates to an improved method of synthesis of highly siliceous ZSM-23 crystalline zeolite.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates, having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5, up to infinity. U.S. Pat. No. 3,941,871, now Re. 29,948, the entire contents of which are incorporated herein by reference, discloses a porous crystalline silicate zeolite made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silicates or organosilicates of varying alumina and metal content.

Zeolite ZSM-23 has been previously synthesized in the presence of a nitrogen-containing organic cation or template such as pyrrolidine, as disclosed in U.S. Pat. No. 4,076,842, the entire contents of which are incorporated herein by reference. However, the synthesis with the previously known organic templates was conducted at a relatively limited silica ($SiO_2$) to alumina ($Al_2O_3$) mole ratios of 40–250. Parent application Ser. No. 490,083 discloses the preparation of ZSM-23 having a silica to alumina mole ratio of 40 to 5000. It has now been found that even higher silica to alumina ratios can be obtained for ZSM-23.

SUMMARY OF THE INVENTION

An improved process for preparing a ZSM-23 zeolite comprises preparing a reaction mixture which comprises sources of an alkali or alkaline earth metal, ($Al_2O_3$), an oxide of silicon ($SiO_2$), water and a nitrogen-containing organic cation $R^+$, and having the following composition, in terms of mole ratios:

| | Broad | Preferred | Most Preferred |
|---|---|---|---|
| $SiO_2/Al_2O_3$ | 5000 to ∞ | 5000 to 20,000 | 5000 to 10,000 |
| $H_2O/SiO_2$ | 5 to 200 | 20 to 100 | 30 to 60 |
| $OH^-/SiO_2$ | 0 to 0.60 | 0.10 to 0.40 | 0.20 to 0.30 |
| $M^+/SiO_2$ | 0.01 to 2.0 | 0.10 to 1.0 | 0.2 to 0.8 |
| $R^+/SiO_2$ | 0.01 to 2.0 | 0.05 to 1.0 | 0.1 to 0.50 | wherein $M^+$ is a cation of an alkali or alkaline earth metal and $R^+$ is the organic cation, designated Diquat-7, of the formula $(CH_3)_3N^+ - R_1 - N^+(CH_3)_3$, wherein $R_1$ is a saturated or unsaturated, straight chain hydrocarbon group having seven carbon atoms, and maintaining the mixture at crystallization conditions until crystals of the ZSM-23 zeolite are formed. Thereafter, the crystals are separated from the liquid and recovered.

Typical reaction conditions consist of heating the foregoing reaction mixture at a temperature of from about 212° F. to about 400° F. for a period of time of from about 24 hours to about 30 days. A more preferred temperature range is from about 300° F. to about 375° F. with the amount of time at a temperature in such range being from about 24 hours to about 7 days.

The digestion of gel particles is carried out until crystals form. The solid product is separated from the reaction medium, in a conventional manner, e.g., by cooling the reaction mixture to room temperature, filtering and water washing.

The crystalline product is dried at a suitable temperature, e.g., at 230° F., for from about 8 to about 24 hours.

Of course, milder drying conditions may be employed if desired, e.g., room temperature under vacuum.

The composition for the synthesis of synthetic ZSM-23 can be prepared utilizing materials which can supply the appropriate oxide. Such materials include aluminates, alumina, silicates, silica hydrosol, precipitated silica, e.g. Hi-Sil, silica gel, silicic acid and hydroxides. It will be understood that each oxide component utilized in the reaction mixture for preparing ZSM-23 can be supplied by one or more essential reactants and they can be mixed together in any order. For example, the alkali metal can be supplied by an aqueous solution of an oxide or hydroxide thereof, and the oxide of silicon by an aqueous solution of a suitable silicate; the cation $R^+$ can be supplied by a hydroxide or an organic or inorganic salt thereof. The aluminum oxide may be provided only as an impurity in another reactant, e.g., the silica source and in some cases, need not be intentionally added. Where very highly siliceous materials are desired as products, the reactants may be treated to remove at least some aluminum removal techniques. The reaction mixture can be prepared either batchwise or continuously. Crystal size and crystallization time of the ZSM-23 composition will vary with the nature of the reaction mixture employed. The size of ZSM-23 crystals produced in accordance with the present invention appears to be very sensitive to the reaction mixture $SiO_2/Al_2O_3$ ratio. Large ($>2$ $\mu$m), well-formed, "rice-grain" shaped crystals appear to grow at $SiO_2/Al_2O_3 > 100$ while aggregates of small crystals ($\sim 0.5$ $\mu$m) tend to form at $SiO_2/Al_2O_3 < 100$.

DETAILED DESCRIPTION OF THE INVENTION

The organic cation $R^+$, also designated herein as Diquat-7, is derived from the Diquat-7 hydroxide or organic or inorganic salt of Diquat-7. The salts of Diquat-7 are obtained by reacting a suitable precursor salt containing the functional group $R_1$, e.g., a heptyl derivative, containing two anions at the terminal carbon atoms, such as, 1,7-dibromoheptane, with a stoichiometrically required amount of trimethylamine to form a diquaternary salt of the organic cation. The synthesis of the original salt of Diquat-7 can be carried out with any organic or inorganic precursor salt containing the functional group $R_1$. The $R_1$ group of the organic cation may be heptyl or it may have one or more double or triple unsaturated bonds. Thus, for example, $R_1$ may have one double unsaturated bond, or two or three consecutive or non-consecutive double unsaturated bonds, e.g., —CH=CH—CH$_2$—CH$_2$—CH$_2$—CH$_2$—CH$_2$—,
—CH$_2$—CH=CH—CH$_2$—CH$_2$—CH$_2$—CH$_2$—,
—CH$_2$—CH$_2$—CH=CH—CH$_2$—CH$_2$—CH$_2$—,
—CH=CH—CH=CH—CH$_2$—CH$_2$—CH$_2$—,
—CH=CH—CH$_2$—CH$_2$—CH$_2$—CH=CH—,
—CH=CH—CH$_2$—CH=CH—CH=CH—, —CH$_2$—CH=CH—CH=CH—CH=CH—,
—CH=C=C=CH—CH$_2$—CH$_2$—CH$_2$—, —CH$_2$—CH=CH—CH—CH=C=CH—.

Alternatively, the $R_1$ group may contain at least one triple unsaturated bond, e.g., —C≡C—CH$_2$—CH$_2$—CH$_2$—CH$_2$—CH$_2$—, —CH$_2$—CH$_2$—C≡C—CH$_2$—CH$_2$—CH$_2$— or —CH$_2$—CH$_2$—CH$_2$—C≡C—CH$_2$—. However, in the most preferred embodiment, the $R_1$ group is heptyl.

The precursor salt contains two anions at the terminal carbon atoms of the functional group $R_1$. Thus, the precursor salt has a formula A—$R_1$—, wherein $R_1$ is as defined above and A is an organic or inorganic anion. Suitable inorganic anions are phosphate, halogens, e.g., fluoride, chloride, bromide or iodide, sulfate, bisulfate, bisulfite, carbonate, bicarbonate, hexafluorophosphate, nitrate, oxyhalogen, such as chlorate, $ClO_3$— or perchlorate, $ClO_4$—. Representative suitable organic anions are carboxylate, R—COO$^-$, amide, $RCONH_2R$, alkoxide, $R_3CO^-$, or etherate, $RO^-$.

Suitable alkali or alkaline earth metals are lithium (Li), sodium (Na), potassium (K), cesium (Cs), magnesium (Mg), calcium (Ca), preferably sodium or potassium, and most preferably sodium. The synthesis of the Diquat-7 salt is conducted with a continuous stirring at a temperature of about 50° C. to about 80° C., preferably about 60° to about 80° C., at autogenous pressure in a suitable non-aqueous solvent, such as alcohol, e.g., ethanol, toluene or tetrahydrofuran, until crystals of the Diquat-7 salt are formed, usually for about 4 to about 24 hours. The crystals of the product settle to the bottom, the reaction mixture is cooled e.g., in a water-ice bath, and the product is separated from the reaction mixture by any suitable means, e.g., by filtration. The crystals are then washed with a suitable solvent, e.g., absolute ethanol, followed by a wash with an anhydrous diethyl ether. The Diquat-7 salt crystals are then dried.

The hydroxide form of Diquat-7 may be obtained in any conventional manner from the salt of Diquat-7, such as by ion exchanging the salt of Diquat-7 with a suitable hydroxide in any conventional manner, e.g., in an ion-exchange column. Any of the conventional ion-exchange techniques may be used to replace the original anions with the hydroxide anion, as will be obvious to those skilled in the art. Representative of such ion exchange techniques are those disclosed in a wide variety of patents, e.g., U.S. Pat. Nos. 3,140,249, 3,140,251 and 3,140,253.

The Diquat-7 salts or hydroxide, when used in the ZSM-23 synthesis in the manner described below, disassociate into the Diquat-7 cations and the respective anions. The synthesis of the Diquat-7, its salts and hydroxide, is also described in a copending U.S. patent application, Ser. No. 490,084, filed Apr. 29, 1983.

The ZSM-23 zeolite has a characteristic X-ray diffraction pattern, set forth below in Table I.

In the as-synthesized form, the zeolite has the formula, in terms of mole ratios of oxides, as follows:

$$(0.01-6)R_2O:(0-2)M_{2/n}O:(x)Al_2O_3:100SiO_2.$$

wherein R is a derivative of the organic cation of the formula $(CH_3)_3N^+$—$R_1$—$N^+(CH_3)_3$ wherein $R_1$ is as defined above, M is an alkali metal or an alkaline earth metal having a valence n and x ranges from about 0 to about 0.02, for example, about 0 to about 0.01 or about 0 to about 0.005. Suitable alkali or alkaline earth metals are set forth above. In the preferred embodiment, the mole ratio of $SiO_2/Al_2O_3$ of the ZSM-23 zeolite, in the as-synthesized form, having the above formula, is 5000 to 20,000. The mole ratio of $SiO_2/Al_2O_3$ of the ZSM-23 zeolite, in the as-synthesized form, having the above formula, is greater than about 5,000. Indeed, the mole ratio of $SiO_2/Al_2O_3$ may go up as far as 10,000, 20,000 or even up to $\infty$, depending on the purity of the reactants.

The original cations of the as synthesized ZSM-23 can be replaced in accordance with techniques well known in the art, at least in part by ion exchange with other cations. Preferred replacing cations include metal ions, ammonium ions, hydrogen ions and mixtures thereof. Particularly preferred cations are those which render the zeolite catalytically active, especially for hydrocarbon conversion. These include hydrogen, rare earth metals, aluminum metals of Groups IIA, IIIB, IVB, VIII, IB, IIB, IIIA and IVA.

The synthetic ZSM-23 zeolite possesses a definite distinguishing crystalline structure whose X-ray diffraction pattern shows substantially the significant lines set forth in Table I.

TABLE I

| d(Å) | I/I$_o$ |
|---|---|
| 11.2 ± 0.23 | Medium |
| 10.1 ± 0.20 | Weak |
| 7.87 ± 0.15 | Weak |
| 5.59 ± 0.10 | Weak |
| 5.44 ± 0.10 | Weak |
| 4.90 ± 0.10 | Weak |
| 4.53 ± 0.10 | Strong |
| 3.90 ± 0.08 | Very Strong |
| 3.72 ± 0.08 | Very Strong |
| 3.62 ± 0.07 | Very Strong |
| 3.54 ± 0.07 | Medium |
| 3.44 ± 0.07 | Strong |
| 3.36 ± 0.07 | Weak |
| 3.16 ± 0.07 | Weak |
| 3.05 ± 0.06 | Weak |
| 2.99 ± 0.06 | Weak |
| 2.85 ± 0.06 | Weak |
| 2.54 ± 0.05 | Medium |
| 2.47 ± 0.05 | Weak |
| 2.40 ± 0.05 | Weak |
| 2.34 ± 0.05 | Weak |

The above values were determined by standard techniques. The radiation was the K-alpha doublet of copper, and a scinitillation counter spectrometer with a strip chart pen recorder was used. The peak heights, I, and the positions as a function of 2 times theta, where theta is the Bragg angle, were read from the spectrometer chart. From these, the relative intensities, 100 I/I$_o$, where I$_o$ is the intensity of the strongest line or peak, and d(obs.), the interplanar spacing in Angstrom units, corresponding to the recorded lines, were calculated. It should be understood that this X-ray diffraction pattern is characteristic of all the species of ZSM-23 compositions. Ion exchange of the sodium ion with cations reveals substantially the same pattern with some minor shifts in interplanar spacing and variation in relative intensity. Other minor variations can occur depending on the silicon to aluminum ratio of the particular sample, and on whether it has previously been subjected to thermal treatment.

While synthetic ZSM-23 zeolites may be used in a wide variety of organic compound conversion reactions, they are notably useful in the processes of polymerization, aromatization, reforming, esterification and cracking. Other hydrocarbon conversion processes for which ZSM-23 may be utilized in one or more of its active forms include, for example, hydrocracking and converting light aliphatics to aromatics, such as disclosed in U.S. Pat. No. 3,760,024.

Synthetic ZSM-23 zeolites can be used either in the alkali metal containing form, the alkali metal form and hydrogen form or another univalent or multivalent cationic form. They can also be used in intimate combination with a hydrogenating component, such as tungsten, vanadium, molybdenum, rhenium, nickel, cobalt, chromium, manganese, or a noble metal, such as platinum or palladium where a hydrogenation-dehydrogenation function is to be performed. Combinations of the aforenoted metals may also be used. Such components can be exchanged into the composition, impregnated thereon or physically intimately admixed therewith. Such components can be impregnated in or on to ZSM-23, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

M can be one or more of a variety of alkali or alkaline earth metal cations, as set forth above, including all alkali metal ions derived from alkali metal oxides or hydroxides, as well as alkali metal ions included in alkali metal silicates and aluminates (not including alkali metal salts, such as sodium chloride or sodium sulfate which may be derived from neutralization of added inorganic acids, such as HCl or H$_2$SO$_4$, or acid salts such as Al$_2$(SO$_4$)$_3$). Nonlimiting examples of such suitable meal ions include sodium and potassium.

Synthetic ZSM-23, when employed either as an adsorbent or as a catalyst in a hydrocarbon conversion process, should be at least partially dehydrated. This can be done by thermal treatment, i.e., heating, to a temperature in the range of 50° C. to about 900° C. in an inert temperature, such as air, nitrogen, and at atmospheric or subatmospheric pressures for between 1 and 48 hours. Dehydration can also be performed at lower temperature merely be placing the catalyst in a vacuum, but a longer time is required to obtain a sufficient amount of dehydration.

As mentioned above, synthetic ZSM-23 can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earth, Mn, Ca, Mg, Zn, Cd, Pd, Ni, Ti, Al, Sn, Fe and Co.

Typical ion exchange techniques comprise contacting the synthetic ZSM-23 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,149, 3,140,151, and 3,140,253 the entire contents of all of which are incorporated herein by reference.

Following contact with the salt solution of the desired replacing cation, the zeolite is preferably washed with water and dried at a temperature ranging from 50° C. to about 300° C. and thereafter may be calcined in air or other inert gas at from about 200° C. to a temperature below the zeolite decomposition temperature, preferably about 900° C., for periods of time ranging from 1 to 48 hours or more to produce a catalytically-active thermal decomposition product thereof.

Regardless of the cations replacing the alkali metal in the synthesized form of ZSM-23, the spatial arrangement of the aluminum, silicon and oxygen atoms which form the basic crystal lattices of ZSM-23 remains essentially unchanged by the described replacement of alkali or alkaline earth metal as determined by taking an X-ray powder diffraction pattern of the ion-exchanged material.

The aluminosilicate prepared by the instant invention is formed in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-23 zeolite with another material resistant to the temperatures and other conditions employed in organic conversion processes. Such matrix materials include active and inactive materials and synthetic or naturally occurring zeolites as well as inorganic materials, such as clays, silica and/or metal oxides. The latter may be either naturally occurring or in the form of gelatinous precipitates, sols or gels including mixtures of silica and metal oxides. The use of a matrix material in conjunction with the ZSM-23, i.e., combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the synthetic ZSM-23 catalyst include the montmorillonite and kaolin family, which include the sub-bentonites, and the kaolins commonly known as Dixie, McNamee, Georgia and Florida clays or others in which the main mineral constituents are halloysite, kaolinite, dickite, nacrite, or anauxite. Such clays can be used in the raw state as originally mined or initially subjected to calcination, acid treatment or chemical modification.

In addition to the foregoing materials, the ZSM-23 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-23 and inorganic oxide gel matrix vary widely with the crystalline aluminosilicate content ranging from about 1 to about 90 percent by weight and more usually in the range of about 2 to about 70 percent by weight of the composite.

The ZSM-23 zeolite is useful in the processes of toluene disproportionation and alkylation, catalytic dewaxing, olefin polymerization and aromatization of olefins or paraffins. In employing the ZSM-23 catalyst of this invention for polymerization of olefin containing liquid or gaseous charge stocks, such charge stocks can be polymerized at temperatures of between 550° and 850° F. at an hourly space velocity of between 0.5 and 50 WHSV and a pressure of between 0.1 and 800 psig.

In employing the catalyst of the present invention for aromatization of gaseous or liquid charge stocks which may be olefinic or paraffinic with or without aromatics present, such stocks can be aromatized at temperatures of between 800° and 1200° F. and pressures from 1 to 10 atmospheres and space velocities between 0.1 and 10 WHSV.

The following examples illustrate specific non-limitative embodiments of the invention. All temperatures are in degrees centigrade (°C.), all pressures in atmospheres (atm), and all percent proportions in percent by weight, unless otherwise indicated.

EXAMPLE A

The Diquat-7 dibromide salt used to crystallize zeolite ZSM-23 was prepared by reacting 1,7-dibromoheptane and trimethylamine in accordance with the following stoichiometric equation:

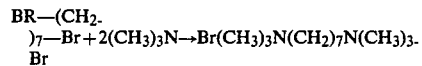

The procedure used was as follows:

150 grams (0.58 mole) of 1,7-dibromoheptane (available from Aldrich Chemical Company) was weighed out and transferred directly to a two-liter, three-necked reaction flask equipped with a stirrer. 300 ml absolute ethanol was added to the reaction flask while the contents of the flask were stirred continuously. Then, 300 grams (excess) of trimethylamine solution (25% in methanol, available from Eastman Kodak Chemical Company) was transferred directly to the two-liter reaction flask. The two-liter reaction flask was fitted with a dry-ice condenser to minimize $(CH_3)_3N$ loss during reflux.

The reaction mixture was refluxed for about 14 hours. White crystals of Diquat-7 dibromide were formed and separated from the reaction solution at the end of the reflux period. The reaction flask was cooled by immersion in water-ice bath. The product was then filtered on a Buchner funnel. Product crystals were washed on the funnel several times with absolute ethanol, then several times with anhydrous diethyl ether. The Diquat-7 dibromine product crystals were dried by air stream on the Buchner funnel after the ether wash.

EXAMPLE 1

50.0 grams (g) of Q-brand sodium silicate (comprising 28.5% by weight (wt.) of $SiO_2$, 8.8% by wt. of $Na_2O$ and 62.7% by wt. of $H_2O$), was added to 50.0 grams of distilled water with stirring until the solution was clear, colorless and uniform. A second solution was produced by adding 2.4 grams of aluminum sulfate $[Al_2(SO_4)_3 16-H_2O]$ and 1.8 grams of $H_2SO_4$ (96%) to 83.9 grams of distilled water. This second solution was stirred until complete dissolution, whereupon 13.1 grams of the Diquat-7 salt produced in Example A was added to the second solution. This second solution and the first solution, containing Q-brand sodium silicate, were then transferred directly to a 300 ml capacity stainless-steel autoclave with vigorous mixing at room temperature and autogeneous pressure. After a uniform hydrogel was produced, the autoclave was sealed and heating begun.

The molar ratios of the ingredients in the reaction mixture were:

| | |
|---|---|
| SiO$_2$/Al$_2$O$_3$ | = 60 |
| H$_2$O/SiO$_2$ | = 40 |
| OH$^-$/SiO$_2$ | = 0.30 |
| Na$^+$/SiO$_2$ | = 0.59 |
| R$^+$/SiO$_2$ | = 0.15 |

The mixture was continuously stirred and maintained at 160° C. for about 5 days, at which time crystallization was complete. The product crystals were filtered out of the solution. The product crystals were then transferred to a beaker containing distilled water and boiled, with stirring, for one hour, after which the product was refiltered and dried under a heat lamp in an air stream for 2 hours.

X-ray analysis of the product showed the crystals to have a diffraction pattern corresponding to that of Table I.

EXAMPLES 2–16

Crystallization of ZSM-23 was conducted in these examples under the same reaction conditions as in Example 1, and with the same reactants, except that silica sol (30% wt. of SiO$_2$, 70% H$_2$O) or Hi Sil precipitated silica was used in some examples, as indicated, as the source of silica instead of the Q-brand sodium silicate, and sodium aluminate (NaAlO$_2$) was used in some examples, also as indicated, as the source of aluminum instead of Al$_2$(SO$_4$)$_3$16H$_2$O. In order to obtain extremely high SiO$_2$/Al$_2$O$_3$, e.g., greater than about 5000, no source of aluminum was added and the silica source was acid extracted with HCl to remove aluminum. The reaction mixture composition, the length of the syntheses and the identity of the product, as identified by the X-ray diffraction data are set forth below in Table II.

TABLE II

| | Mixture Composition (Mole Ratios)$^a$ | | | | |
|---|---|---|---|---|---|
| Example | SiO$_2$/Al$_2$O$_3$ | OH$^-$/SiO$_2$ | Na/SiO$_2$ | Diquat-7$^b$/SiO$_2$ | Synthesis Time (hrs) | Product |
| 2 | 90 | 0.30 | 0.32 | 0.07 | 72 | 100% ZSM-23 |
| 3$^d$ | 90 | 0.30 | 0.32 | 0.07 | 72 | 100% ZSM-23 |
| 4 | 200 | 0.20 | 0.21 | 0.10 | 120 | 100% ZSM-23 |
| 5$^d$ | 200 | 0.20 | 0.21 | 0.10 | 120 | 100% ZSM-23 |
| 6 | 400 | 0.20 | 0.20 | 0.10 | 144 | 100% ZSM-23 |
| 7$^d$ | 400 | 0.20 | 0.20 | 0.10 | 84 | 100% ZSM-23 |
| 8$^d$ | 500 | 0.20 | 0.20 | 0.10 | 96 | 100% ZSM-23 |
| 9$^d$ | 700 | 0.20 | 0.20 | 0.10 | 168 | 100% ZSM-23 |
| 10$^d$ | 1000 | 0.20 | 0.20 | 0.10 | 120 | 100% ZSM-23 |
| 11$^d$ | 2000 | 0.20 | 0.20 | 0.10 | 97 | 100% ZSM-23 |
| 12$^d$ | 3000 | 0.20 | 0.20 | 0.10 | 72 | 100% ZSM-23 |
| 13$^d$ | 5000 | 0.20 | 0.20 | 0.10 | 72 | 100% ZSM-23 |
| 14$^e$ | 5000 | 0.20 | 0.20 | 0.10 | 72 | 100% ZSM-23 |
| 15$^d$ | 8000 | 0.20 | 0.20 | 0.10 | 72 | 100% ZSM-23 |
| 16$^f$ | ∞ | 0.20 | 0.20 | 0.10 | 120 | 100% ZSM-23 |

$^a$H$_2$O/SiO$_2$ = 40 for all examples.
$^b$Diquat-7 = (CH$_3$)$_3$N$^+$(CH$_2$)$_7$N$^+$(CH$_3$)$_3$; Bromide salt.
$^c$Q-brand sodium silicate; Al$_2$(SO$_4$)$_3$ 16 H$_2$O.
$^d$Silica sol (30% SiO$_2$; 70% H$_2$O)); NaAlO$_2$.
$^e$HiSil (HCl extracted); NaAlO$_2$
$^f$HiSil (HCl extracted); no intentionally added Al$_2$O$_3$ Analytical data for the as-synthesized ZSM-23 samples, in terms of mole ratios, of some examples is set forth in Table III.

TABLE III

| | | Moles per mole Al$_2$O$_3$ | | |
|---|---|---|---|---|
| Example | C/N (mole ratio) | N$_2$O | Na$_2$O | SiO$_2$ |
| 1 | — | — | — | 41 |
| 2 | 6.5 | 1.6 | 0.83 | 56 |
| 3 | 6.5 | 1.6 | 0.83 | 56 |
| 4 | 6.1 | 4.7 | 0.78 | 173 |
| 5 | 6.1 | 4.7 | 0.78 | 173 |
| 7 | 6.9 | 6.3 | 2.6 | 274 |
| 9 | — | — | — | 420 |
| 11 | 6.3 | 23 | 6.1 | 1,020 |
| 12 | 6.7 | 20 | 5.9 | 875 |
| 13 | 6.8 | 45 | 12 | 2,000 |
| 14 | 6.2 | 59 | 11 | 2,400 |
| 15 | 7.0 | 48 | 13 | 2,140 |
| 16 | 6.4 | 304 | 63 | 10,050 |

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A process for preparing a ZSM-23 zeolite having an X-ray diffraction pattern of Table I, comprising preparing a reaction mixture which comprises sources of an alkali metal, an oxide of aluminum (Al$_2$O$_3$), an oxide of silicon (SiO$_2$), water and a nitrogen-containing organic cation R$^+$ and having the following composition, in terms of mole ratios:

SiO$_2$/Al$_2$O$_3$ = 5000 to ∞
H$_2$O/SiO$_2$ = 5 to 200
OH$^-$/SiO$_2$ = 0 to 0.60
M$^+$/SiO$_2$ = 0.01 to 2.0
R$^+$/SiO$_2$ = 0.01 to 2.0 wherein M$^+$ is a cation of an alkali or alkaline earth metal and R$^+$ is an organic cation of the formula (CH$_3$)$_3$N$^+$—R$_1$—N$^+$(CH$_3$)$_3$ wherein R$_1$ is a saturated or unsaturated straight chain hydrocarbon group having seven carbon atoms, and maintaining the mixture at crystallization conditions until crystals of the ZSM-23 zeolite are formed.

2. A process of claim 1 wherein R$_1$ is a straight chain hydrocarbon group containing three double bonds.

3. A process of claim 2 wherein R$_1$ is

—CH=CH—CH$_2$—CH=CH—CH=CH—.

4. A process of claim 1 wherein R$_1$ is heptyl.

5. A process of claim 4 wherein the mole ratio of SiO$_2$/Al$_2$O$_3$ is 10,000 to ∞.

6. A process of claim 4 wherein the mole ratio of SiO$_2$/Al$_2$O$_3$ is 20,000 to ∞.

7. A process of claim 1 wherein the mole ratio of SiO$_2$/Al$_2$O$_3$ is 5,000 to 10,000.

8. A synthetic crystalline ZSM-23 zeolite material in the as-synthesized form having a formula, in terms of moles of oxides, in the anhydrous state:

(0.01–6)R$_2$O:(0–2)M$_{2/n}$O:(x)Al$_2$O$_3$:(100)SiO$_2$ wherein R$_2$O is an oxide of a promoter, organic or inorganic salt thereof, the promoter being a cation of the formula

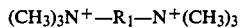

wherein $R_1$ is a saturated or unsaturated straight chain hydrocarbon group having seven carbon atoms and M is an alkali or alkaline earth metal having a valence n, and x ranges from about 0.005 to 0.02.

9. A ZSM-23 zeolite material of claim 8 wherein X ranges from about 0.005 to about 0.01.

10. A ZSM-23 zeolite material of claim 8 wherein X is about 0.005.

11. A ZSM-23 zeolite material of claim 8 wherein x ranges from about 0.01 to about 0.02.

12. A ZSM-23 zeolite material of claim 8 wherein $R_1$ is a straight chain hydrocarbon group containing three double bonds.

13. A ZSM-23 zeolite material of claim 8 wherein $R_1$ is —CH=CH—CH$_2$—CH=CH—CH=CH—.

14. A ZSM-23 zeolite material of claim 8 wherein $R_1$ is heptyl.

15. A ZSM-23 zeolite material of claim 14 wherein the mole ratio of $SiO_2/Al_2O_3$ is 5,000 to 20,000.

16. A ZSM-23 zeolite material of claim 15 wherein the mole ratio of $SiO_2/Al_2O_3$ is 10,000 to 20,000.

17. A ZSM-23 zeolite material of claim 14 wherein the mole ratio of $SiO_2/Al_2O_3$ is about 20,000.

18. A ZSM-23 zeolite material of claim 14 wherein the mole ratio of $SiO_2/Al_2O_3$ is 5,000 to 10,000.

* * * * *

UNITED STATES PATENT AND TRADEMARK OFFICE
CERTIFICATE OF CORRECTION

PATENT NO. : 4,619,820

DATED : October 28, 1986

INVENTOR(S) : Ernest W. Valyocsik

It is certified that error appears in the above-identified patent and that said Letters Patent is hereby corrected as shown below:

Col. 4, line 1, "$A-R_1-,$" should be --$A-R_1-A,$--

Signed and Sealed this

Eighth Day of September, 1987

*Attest:*

*Attesting Officer*

DONALD J. QUIGG

*Commissioner of Patents and Trademarks*